US005223765A

United States Patent [19]

Staron et al.

[11] Patent Number: 5,223,765

[45] Date of Patent: Jun. 29, 1993

[54] DEVICE FOR THE DISPLAY OR PROJECTION OF IMAGES OR SIMILAR INFORMATION WITH COATING OF ADAMANTANE CARBON

[75] Inventors: Alain Staron; Paul-Louis Meunier, both of Paris; Jean-Marie Mackowski, Villeurbanne, all of France

[73] Assignee: Thomson Consumer Electronics, Courbevoie, France

[21] Appl. No.: 714,621

[22] Filed: Jun. 13, 1991

[30] Foreign Application Priority Data

Jun. 15, 1990 [FR] France ............................... 90 07517

[51] Int. Cl.[5] ........................ H01J 29/88; H01J 29/89; G02B 1/00

[52] U.S. Cl. .................................... 313/478; 313/479; 313/480; 358/250; 358/253; 358/247

[58] Field of Search ................... 313/112, 477 R, 478, 313/479, 480; 358/250, 252, 253, 247; 220/2.1 A

[56] References Cited

U.S. PATENT DOCUMENTS

| | | | |
|---|---|---|---|
| 4,767,969 | 8/1988 | Green | 313/479 |
| 4,798,994 | 1/1989 | Rijpers et al. | 313/478 |
| 4,804,883 | 2/1989 | Müller et al. | 313/478 |
| 4,839,736 | 6/1989 | Sugihara et al. | 313/478 |
| 5,025,490 | 6/1991 | Tamura | 313/478 |
| 5,132,585 | 7/1992 | Kane et al. | 313/479 |

OTHER PUBLICATIONS

Society for Information Display International Symposium (Digest of Technical Papers), Baltimore, Md., May 16-18, 1989, vol. XX, pp. 270-273, US; Hiromitsu Kawamura, et al., "Combined Antistatic and Antireflection Coating for CRT's Introduction", FIG. 2.

Patent Abstracts of Japan, vol. 8, No. 209 (E-268) [1646], Sep. 22, 1984; and JP-A-59 096 638 (Asahi Glass) Jun. 4, 1984.

Patent Abstracts of Japan, vol. 14, No. 255 (E-935 ) [4198], May 31, 1990; and JP-A-02 075 137 (Hitachi) Mar. 14, 1990.

*Primary Examiner*—Donald J. Yusko

*Assistant Examiner*—J. Edward Giust

*Attorney, Agent, or Firm*—Oblon, Spivak, McClelland, Maier & Neustadt

[57] ABSTRACT

A device for the display or projection of images, which has an external output face covered with an abrasion-resistant and transparent coating, said coating constituted in part of an abrasion-resistant layer formed from at least one material selected from the group consisting of adamantane carbon, $Y_2O_3$, and indium-tin oxide implanted with oxygen. A display or projection device can be a television tube designed for the display of high-definition transmissions.

5 Claims, 1 Drawing Sheet

FIG_3
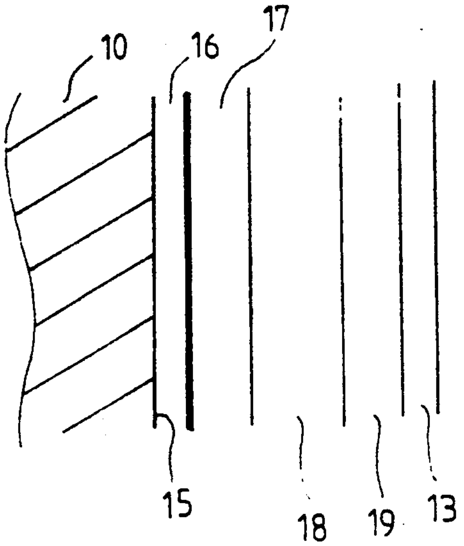
FIG_1
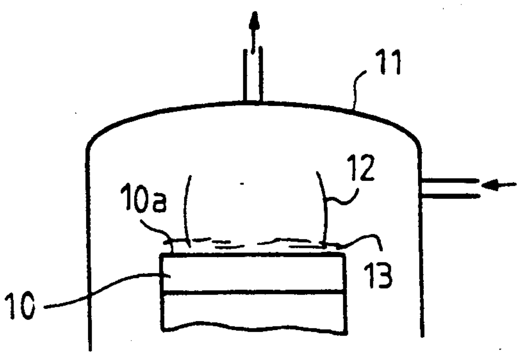
FIG_2
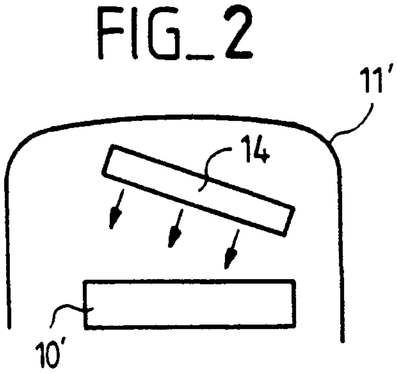
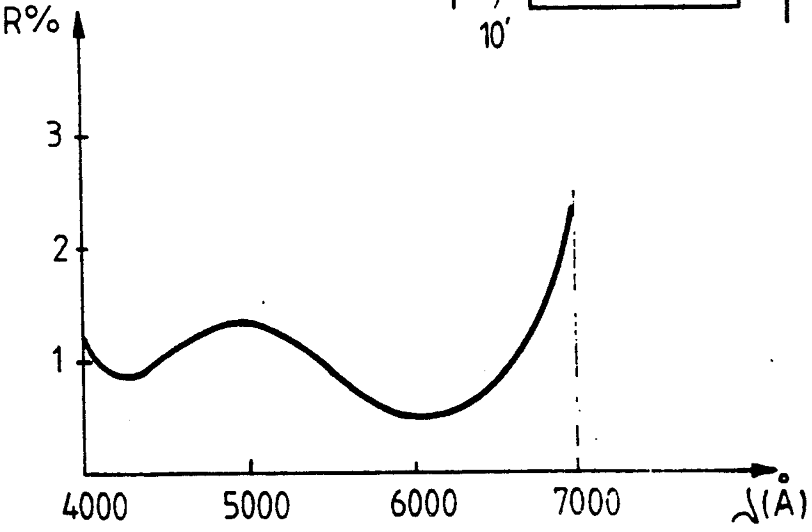
FIG_4

DEVICE FOR THE DISPLAY OR PROJECTION OF IMAGES OR SIMILAR INFORMATION WITH COATING OF ADAMANTANE CARBON

BACKGROUND OF THE INVENTION

The invention relates to a device for the display or projection of images or similar information.

Display devices such as cathode-ray tubes and liquid crystal display units have a transparent front wall, most usually made of glass. The image is formed on one side of this wall and is observed on the other side.

The quality of the image observed depends on the physical properties of the material of the wall and on its state, notably the state of the external face.

In the same way, the projection device usually has an output objective and the quality of the projected image may be lowered if the external surface of the projection objective is in poor condition.

The invention can be used to reduce dependence on external disturbances of the state of the external surface of the transparent front wall of the display device or the state of the external face of the projection objective.

SUMMARY OF THE INVENTION

According to the invention, the external face of the transparent front wall of the display or projection device is covered with a transparent layer of abrasion-resistant material, having a hardness that is substantially greater than that of the material constituting the front wall or objective and/or with a layer of a conductive transparent material.

An abrasion-resistant layer reduces the risk of the deterioration, for example through scratches, of the external face of the front wall or of the objective. A conductive layer can be used to prevent the external face from attracting dust by the accumulation of static electricity.

These arrangements are particularly useful when high-definition images are displayed or projected, notably in high-definition television. Indeed, in the case of high-definition television, with a total number of lines of the order of 1,000 and about 1,000 dots per line, where the number of image dots is in the range of $10^6$, the image (or picture) elements or pixels are small-sized. The result of this is that the deterioration of the external observation face or projection face, notably by scratches or dust, may substantially lower the quality of the displayed or projected image.

In a preferred embodiment, either the abrasion-resistant or the conductive layer is associated, or both of them are associated, with a anti-reflection layer enabling a reduction in the coefficient of reflection of the ambient light on the external display or projection face.

If several layers are provided, then the abrasion-resistant layer will preferably be the external layer.

In one embodiment only one layer is provided. This layer is both abrasion-resistant and conductive. It is made, for example, of a conductive indium-tin oxide, the abrasion-resistant function of which is achieved by a surface densification through the implantation of oxygen ions.

It has been observed that good results are obtained by using adamantane carbon as an abrasion-resistant material. Indeed, this material has little roughness. It has a hardness of 1,500 to 4,000 $Kg/mm^2$ and is chemically inert. Preferably, a small thickness of less than 100 Å will be chosen so as not to lower the transmission quality of the transparent wall or of the objective to be shielded.

The mechanical and optic properties of adamantane carbon may be adjusted if it is mixed with selected quantities of hydrogen. In particular, the refraction index may be chosen, as desired, between 1.9 and 2.1 with a hydrogen atom rate of 35% to 55%. The usefulness of being able to adjust the choice of the index of refraction is that, in this way, it becomes easily possible to associate an anti-reflection layer with said layer made of adamantane carbon.

Adamantane carbon is also a filter that counters the transmission of ultraviolet radiation.

The adamantane carbon may be deposited on a glass wall that has generally been coated beforehand with conductive and/or anti-reflection layers. The adamantane carbon may be deposited on the glass wall by a method of chemical vapor deposition using a plasma based on a hydrocarbon such as methane $CH_4$. Naturally, other methods may be used to deposit adamantane carbon. These methods may include the bombardment of a graphite target positioned so as to face the wall to be coated, the combustion of acetylene and hydrogen in the presence of oxygen, etc.

BRIEF DESCRIPTION OF THE DRAWING

Other features and advantages of the invention shall appear from the following description of some of its embodiments, said description being made with reference to the appended drawing, wherein:

FIG. 1 shows a device for the deposition of adamantane carbon on the panel of a television tube according to the invention;

FIG. 2 shows another device for the deposition of adamantane carbon on the front face of a television tube according to the invention;

FIG. 3 is a drawing of a part of the front face of the panel of a television tube according to the invention, and FIG. 4 is a graph illustrating certain properties of the tube of FIG. 3.

DETAILED DESCRIPTION OF THE INVENTION

Generally speaking, the invention consists in the placing of a layer of material that resists abrasion and/or a conductive material on the front face (which is visible) of an image display or image projection device. Naturally, the added layer is transparent.

Furthermore, it is preferable for the abrasion-resistant and/or conductive layer to be associated with an anti-reflection layer.

The rest of this description shall refer solely to cathode-ray tube for high-definition television. Such a tube has a glass envelope that ends, at the front, in a panel with a front display face.

It is preferable to provide for single layer that fulfils the abrasion-resistant and electricity conducting function. To this effect, an indium-tin oxide (ITO) is used. The indium-tin oxide used has a high surface density obtained through an oxygen implantation carried out by ion bombardment.

This treatment reduces the risks of scratches to the minimum. Furthermore, for a anti-reflection effect, it would be preferable to treat this oxide in such a way that it has an index of refraction equal to the square root of the index of the glass constituting the panel of the tube.

Naturally, the thickness of the indium-tin oxide layer is small enough, of the order of 100 Å to 200 Å, for it to be transparent. However, this layer remains transparent upto a thickness of the order of 5,000 Å or more.

For the abrasion-resistant function, the material used will preferably be adamantane carbon with a structure similar to that of diamond. In this case, the adamantane carbon, deposited in a thickness of 4 Å to 100 Å, constitutes the last layer deposited on a conductive and/or anti-reflection ITO layer.

Adamantane carbon has an amorphous structure. It is chemically inert and has a hardness of 1,500 to 4,000 $Kg/mm^2$. It can be deposited by several techniques. Preferably, the technique used will be the PCVD technique in which the panel 10 of the tube is deposited in a chamber 11 (FIG. 1) into which methane $CH_4$ or another hydrocarbon is introduced, and an ultrahigh frequency plasma 12 that cracks the plasma molecules is formed. Thus, the hydrogen is separated from the carbon. This carbon gets deposited on the target 10a constituted by the external face of the panel of the tube.

A deposit of adamantane carbon with a thickness of 20 Å to 50 Å is obtained within a few tens of seconds.

It may be advantageous for the deposited layer 13 to contain hydrogen. To this effect, the quantity of hydrogen may be adjusted by limiting the proportion of the hydrogen molecules that are cracked.

The refraction index of the adamantane carbon is between 1.9 and 2.1 if the proportion of hydrogen atoms is between 35% and 55%.

The mechanical properties depend also on the quantity of hydrogen. They depend also on the speed of growth of the layer of adamantane carbon. Thus for a deposition with a growth of 60 Å/minute, the Knoop hardness HK is expressed by the following formula:

$$HK\ (Kg/mm^2) = 50 \times Hat\ (\%) - 250$$

Hat being the proportion of hydrogen atoms in %.

In one variant (FIG. 2), the panel 10' of the tube is positioned in a chamber 11' within which a high vacuum of the order of $10^{-6}$ torr is set up. Before the panel 10', there is a target 14 made of graphite. The face of this target, which is placed before the external face of the panel 10', is bombarded by ions that liberate carbon ions which get deposited on the substrate.

In both cases, the substrate 10, 10' is heated to a temperature of the order of 200° C. to 300° C.

It is also possible to form adamantane carbon by the combustion in oxygen of a hydrocarbon with hydrogen, the panel being heated to a temperature of the order of 800° C. It is also possible to envisage the use of a standard diamond-growing technique wherein the panel is heated to a temperature of 600° C. to 1,100° C. in a chamber into which there is inserted a tungsten filament heated to 2,000° C. by the passage of current, said chamber containing a mixture of 98.5% of hydrogen, 1% of methane $CH_4$ and 0.5% of oxygen.

FIG. 3 shows a schematic view of an external surface coating 15 of the panel 10 of a television tube. On the glass substrate 10, having a refraction index equal to 1.54, there is deposited a titanium oxide $TiO_2$ layer 16 with a refraction index of 2.4 and a thickness of 70.1 Å, then a silica layer 17 with a thickness of 537 Å and an index of 1.45, then another titanium oxide $TiO_2$ layer 18 with a thickness of 6,093 Å, then another silica layer 19 with a thickness of 680 Å and finally the adamantane carbon 13 with a thickness of 100 Å.

Naturally, the adamantane carbon, with an index of 1.9, may be replaced by ITO.

The layers 16 to 19 have an index matching role that enables the anti-reflection function to be fulfilled.

With a structure of the type shown in FIG. 3, it has been observed that the losses by reflection range from 0.5% to 2% for visible radiation. These losses are shown in the graph of FIG. 4 where the wavelength λ of the light is shown on the x-axis and the losses R by reflection are shown on the y-axis.

These losses by reflection are for incidence values of less than 45°. The losses increase substantially for high values of incidence.

For the abrasion-resistant effect, the adamantane carbon may be replaced by amorphous carbon or by another hard oxide such as $Y_2O_3$ or $Al_2O_3$ (alumina).

Finally, it may be noted that it is possible to use both adamantane carbon and ITO at the same time. This raises no particular problem owing to the equality of the indices of these materials. In one embodiment, the abrasion-resistant layer is adamantane carbon, and is covered by a fine film of hard, conductive ITO.

What is claimed is:

1. A device for the display or projection of images, having an external output face covered with an abrasion-resistant and transparent coating, wherein the abrasion-resistant layer of the coating is formed of adamantane carbon, said layer containing hydrogen.

2. The device of claim 1, wherein the thickness of the layer of adamantane carbon ranges from 4–100 Å.

3. The device of claim 1, wherein said transparent coating is a conductive transparent coating.

4. The device of claim 1, wherein said external face having said abrasion-resistant and transparent coating is provided with an anti-reflection coating.

5. The device of claim 1 or 4, wherein said abrasion-resistant layer is the external layer of said coating.

* * * * *